US005987037A

United States Patent [19]
Gans

[11] Patent Number: 5,987,037
[45] Date of Patent: Nov. 16, 1999

[54] MULTIPLE BEAM WIRELESS TELECOMMUNICATION SYSTEM

[75] Inventor: Michael James Gans, Holmdel, N.J.

[73] Assignee: Lucent Technologies Inc., Murray Hill, N.J.

[21] Appl. No.: 08/606,621

[22] Filed: Feb. 26, 1996

[51] Int. Cl.[6] .......... H04J 1/00

[52] U.S. Cl. .......... 370/480; 455/103; 455/277.1

[58] Field of Search .......... 370/319, 328, 370/480, 481, 482; 455/102, 103, 562, 277.1, 277.2, 278.1, 20, 25, 118; 375/267, 299; 342/371–374

[56] References Cited

U.S. PATENT DOCUMENTS

| | | | |
|---|---|---|---|
| 5,048,116 | 9/1991 | Schaeffer | 455/103 |
| 5,396,489 | 3/1995 | Harrison | 370/481 |
| 5,563,610 | 10/1996 | Reudink | 455/277.1 |
| 5,579,341 | 11/1996 | Smith et al. | 455/103 |
| 5,602,555 | 2/1997 | Searle et al. | 455/562 |
| 5,604,462 | 2/1997 | Gans et al. | 330/124 R |
| 5,631,898 | 5/1997 | Dent | 370/203 |

OTHER PUBLICATIONS

H. Foster et al., Butler Network Extension To Any Number of Antenna Ports, IEEE Transactions on Antennas and Propagations, Nov. 1970, pp. 818–820.

R. Johnson, Antenna Engineering Handbook, McGraw Hill Publishing Co., 3rd edition, 1993, pp. 20–59 to 20–60.

*Primary Examiner*—Min Jung

[57] ABSTRACT

Disclosed is a multiple-beam transmitting system for use in a wireless telecommunication system, including a radio transmitter assembly, which can be situated at the bottom of a base station tower, and a transmitter subassembly that can be situated atop the base station tower. The radio transmitter assembly is operative to modulate and frequency translate a plurality of input information-bearing signals. The signals are then combined to form a first FDM signal, which can then be routed to the transmitter subassembly via a single FDM cable running up the tower. The transmitter subassembly includes a power splitter for splitting the first FDM signal into a plurality of second FDM signals and a plurality of frequency translators, each for frequency translating one of the second FDM signals. Each frequency translator thereby places at least one of the information-bearing signals within a predetermined translated frequency band. A multiple-beam-antenna radiates a plurality of antenna beams, with each antenna beam transmitting at least one of the information-bearing signals placed by an associated frequency translator within the translated frequency band. A multiple beam receiving system can be employed to receive incoming signals from wireless terminals.

31 Claims, 11 Drawing Sheets

MULTIPLE BEAM WIRELESS TELECOMMUNICATION SYSTEM

FIELD OF THE INVENTION

The present invention relates generally to wireless telecommunications, and more particularly, to a multiple-antenna-beam wireless telecommunication system and base station electronic equipment therefor.

BACKGROUND OF THE INVENTION

Wireless telecommunication base stations in the prior art typically employ one or more broad beam antennas to transmit and receive information-bearing signals to wireless terminals, e.g., cellular telephones, within a given radius of the base station. With this approach, each broad beam in azimuth can typically be used as the conduit for communications with a mobile wireless terminal traveling over a wide angular sector in relation to the base station.

One shortcoming of broad beam systems is short communication range. In general, the distance from which wireless terminals can communicate with the base station is proportional to the base station antenna gain, and inversely proportional to the solid angle beamwidth, for a given transmitter power level. More specifically, the nth power of this distance is directly proportional to the base station antenna gain, where n is typically between three and four. Short communication range can pose severe cost constraints for practical systems, especially in rural areas, since a large number of base stations would be needed to cover a correspondingly large geographical area.

Another drawback of broad beam systems is inefficient use of transmitter power. For example, in frequency-division-multiple-access (FDMA) systems, a narrow frequency channel, e.g., 30 kHz wide, is dedicated to each communication session with a wireless terminal. Typically, each broad beam transmits a frequency division multiplexed (FDM) signal carrying information-bearing signals of many communication channels to associated wireless terminals. Since each wireless terminal is located in only one angular direction at a time, and signal power intended for that wireless terminal is transmitted over a broad angular sector, power is wasted. In addition, the likelihood of interference from other communication sessions can be high, inasmuch as each wireless terminal must filter out many undesired signals in order to communicate. Interference oftentimes results when such filtering is less than perfect. The base station receiver is faced with an analogous problem.

One solution to the above-noted limitations of broad beam systems is disclosed in commonly assigned, co-pending U.S. patent application Ser. No. 08/506286 entitled "Power Shared Linear Amplifier Network". Therein, multi-beam communication systems are disclosed, each of which utilize a power-shared amplifier network comprising a pair of power sharing networks, such as Butler Matrices, and a plurality of amplifiers coupled therebetween. The power sharing aspect of the system provides advantages over compartmentalized narrow beam systems that use a power amplifier dedicated to each beam. That is, each amplifier in the power shared amplifier network amplifies power of all the information-bearing signals to be transmitted, thereby improving system reliability and enhancing communication traffic-handling capability on a statistical basis. Multiple, high gain beams can be formed either by a separate antenna dedicated for each beam, or by several multi-beam antennas. The disclosed systems, however, typically utilize switching networks to switch modulated signals to the appropriate antenna beam for transmission and reception. For systems with a large number of users, such switching networks can be become complex and costly. Additionally, if the base station radios used for modulating the information-bearing signals are located at the bottom of a base station tower, and the antennas are at the top of the tower, as is typical, the cabling requirements to connect the radios to the antennas can become burdensome.

SUMMARY OF THE INVENTION

In an illustrative embodiment of the present invention, a transmitting system, suitable for use at a base station in a wireless telecommunication system, is capable of transmitting information-bearing signals on multiple antenna beams while avoiding complex RF switching and cabling requirements characteristic of prior art systems.

The transmitting system of the illustrative embodiment includes a radio transmitter assembly, which can be situated at the bottom of a base station tower, and a transmitter subassembly that can be situated atop the base station tower. The radio transmitter assembly is operative to modulate and frequency translate a plurality of input information-bearing signals. The signals are then combined to form a first FDM signal, which can then be routed to the transmitter subassembly via a single FDM cable running up the tower.

The transmitter subassembly includes a power splitter for splitting the first FDM signal into a plurality of second FDM signals and a plurality of frequency translators, each for frequency translating one of the second FDM signals. Each frequency translator thereby places at least one of the information-bearing signals within a predetermined translated frequency band. Optionally, the translated frequency band is the same for each frequency translator and has a narrower bandwidth than the bandwidth of the first FDM signal. A multiple-beam-antenna radiates a plurality of antenna beams, with each antenna beam transmitting at least one of the information-bearing signals placed by an associated frequency translator within the translated frequency band.

The channels into which the input information-bearing signals are placed by the radio transmitter assembly can be dynamically allocable by controlling other frequency translators within the radio transmitter assembly, e.g., at the bottom of the tower. In this manner, any or all of the information-bearing signals can be transmitted by any one of the antenna beams.

A receiver system can be used in conjunction with the transmitter system of the illustrative embodiment. The receiver system includes a receiver subassembly and a radio receiver assembly. The receiver subassembly receives signals from wireless terminals on multiple beams, preferably using the same multiple-beam-antenna used for transmit. The signals received on each beam are translated by further frequency translators, and then combined to form a third FDM signal. The third FDM signal is routed to the radio receiver assembly, which may be located at the bottom of the base station tower. The radio receiver assembly preferably includes a plurality of frequency translators and associated radio receivers for isolating the incoming signals within the third FDM signal and preparing the signals for subsequent transmission to a telephone network. Optionally, at least one additional frequency translator and radio receiver is provided, which function together and in conjunction with the base station controller to determine a suitable or superior antenna beam for each wireless terminal user.

BRIEF DESCRIPTION OF THE DRAWINGS

For a better understanding of the subject invention, reference is had to exemplary embodiments thereof, taken in conjunction with the accompanying drawings in which like reference numerals depict like elements or features, wherein.

DETAILED DESCRIPTION OF THE PREFERRED EMBODIMENTS

Figure 1A:
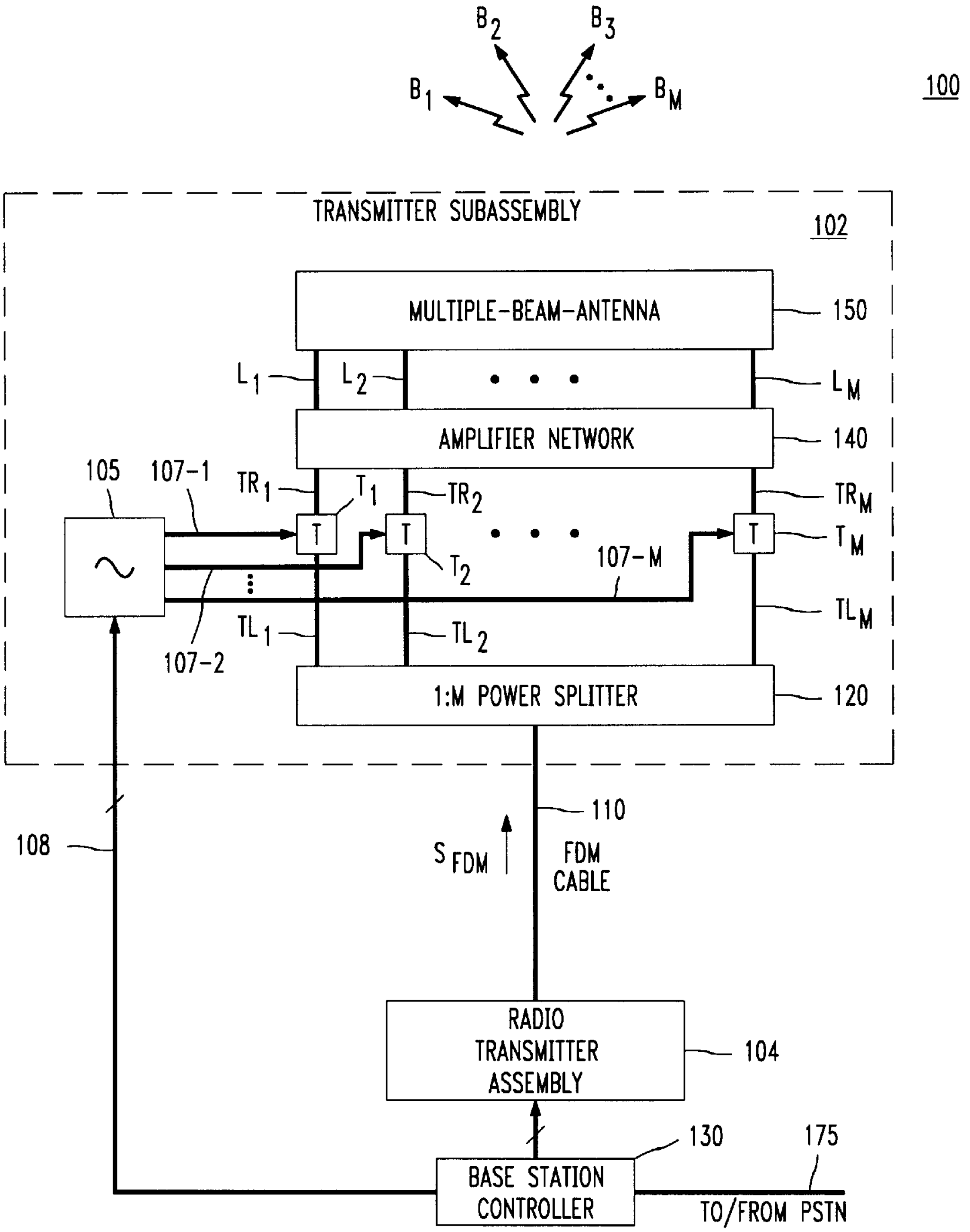
FIG. 1A is a block diagram of an exemplary transmitter system in accordance with the subject invention.

To illustrate the principles of the present invention, a preferred embodiment of the invention will be described below as forming a portion of base station electronic equipment in a wireless telecommunication system. It is to be understood, however, that the embodiment to be described is merely exemplary, and that the invention may also be employed in other types of systems, for example, satellite communication or broadcasting systems.

FIG. 1. schematically illustrates an embodiment of a transmitting system in accordance with the present invention, designated generally as 100. Transmitting system 100 includes transmitter subassembly 102 and radio transmitter assembly 104 interconnected by a frequency division multiplexed (FDM) cable 110. FDM cable 110 is typically a low loss, highly shielded coaxial cable. Subassembly 102 is particularly suitable for deployment at a first equipment location, such as at the top of a base station tower (not shown) in a wireless telecommunication system, e.g., in a cellular telephone system. Radio transmitter assembly 104 can be employed at a second equipment location, such as within an equipment shelter at the bottom of a base station tower.

Base station controller 130 interfaces with a Public Switched Telephone Network (PSTN) via communications link 175, e.g., a copper wireline, fiber optic or microwave link. As is conventional, information-bearing signals are transceived between the base station controller and the PSTN via a Wireless Switching Center (not shown). These information-bearing signals can comprise voice signals or electronic data, such as E-mail or facsimile data. Base station controller 130 supplies the information-bearing signals received from the PSTN to radios within radio transmitter assembly 104. Within assembly 104, the information-bearing signals are modulated, frequency translated and then combined to form an FDM signal $S_{FDM}$ on FDM cable 110. Frequency-delimited channels within the FDM signal can be dynamically allocated to the individual information-bearing signals under the control of base station controller 130. Signal $S_{FDM}$ carries up to a plurality K of information-bearing signals in up to M FDM channels on the FDM cable, where K is generally greater than M. Hence, each one of the M channels is capable of carrying a plurality of information-bearing signals. It is noted that the frequency division multiplexing of the signals can also be performed in conjunction with code division multiple access (CDMA) or time division multiple access (TDMA).

In transmitter subassembly 102, signal $S_{FDM}$ is split up by 1:M power splitter 120 to form M FDM signals, each present on one of M output lines $TL_1$ to $TL_M$. Each of the M signals on lines $TL_1$ to $TL_M$ is an attenuated version of signal $S_{FDM}$ (by virtue of the power split) and is applied to a respective frequency translator $T_1$ to $T_M$. (Frequency translators disclosed herein are denoted by the legend "T"). Each frequency translator $T_1$ to $T_M$ functions to frequency translate and preferably filter the associated FDM signal, thereby isolating information-bearing signals within one of the M frequency channels on the FDM cable. Each frequency translator $T_1$ to $T_M$ is coupled to a common frequency synthesizer 105 via an associated control line 107-1 to 107-M. Preferably, a different local oscillator frequency is provided on each line 107-1 to 107-M. This enables each frequency translator to isolate information signals within a unique, permanently assigned frequency band on the FDM cable, as will be explained further below.

The isolated signals on lines $TR_1$ to $TR_M$ are applied to amplifier network 140 where they are each amplified, preferably in a power-sharing arrangement, to power levels suitable for subsequent radiation. The amplified signals appear on lines $L_1$ to $L_M$ and are applied to multiple-beam-antenna 150, which forms M narrow beams $B_1$ to $B_M$. Each beam $B_1$ to $B_M$ points in a distinct angular direction to radiate signals within a narrow angular sector centered about the beam peak. Each beam is thus dedicated for communication with wireless terminals within the associated angular sector. Preferably, beams $B_1$ to $B_M$ provide 360° of azimuthal coverage.

Figure 1B:
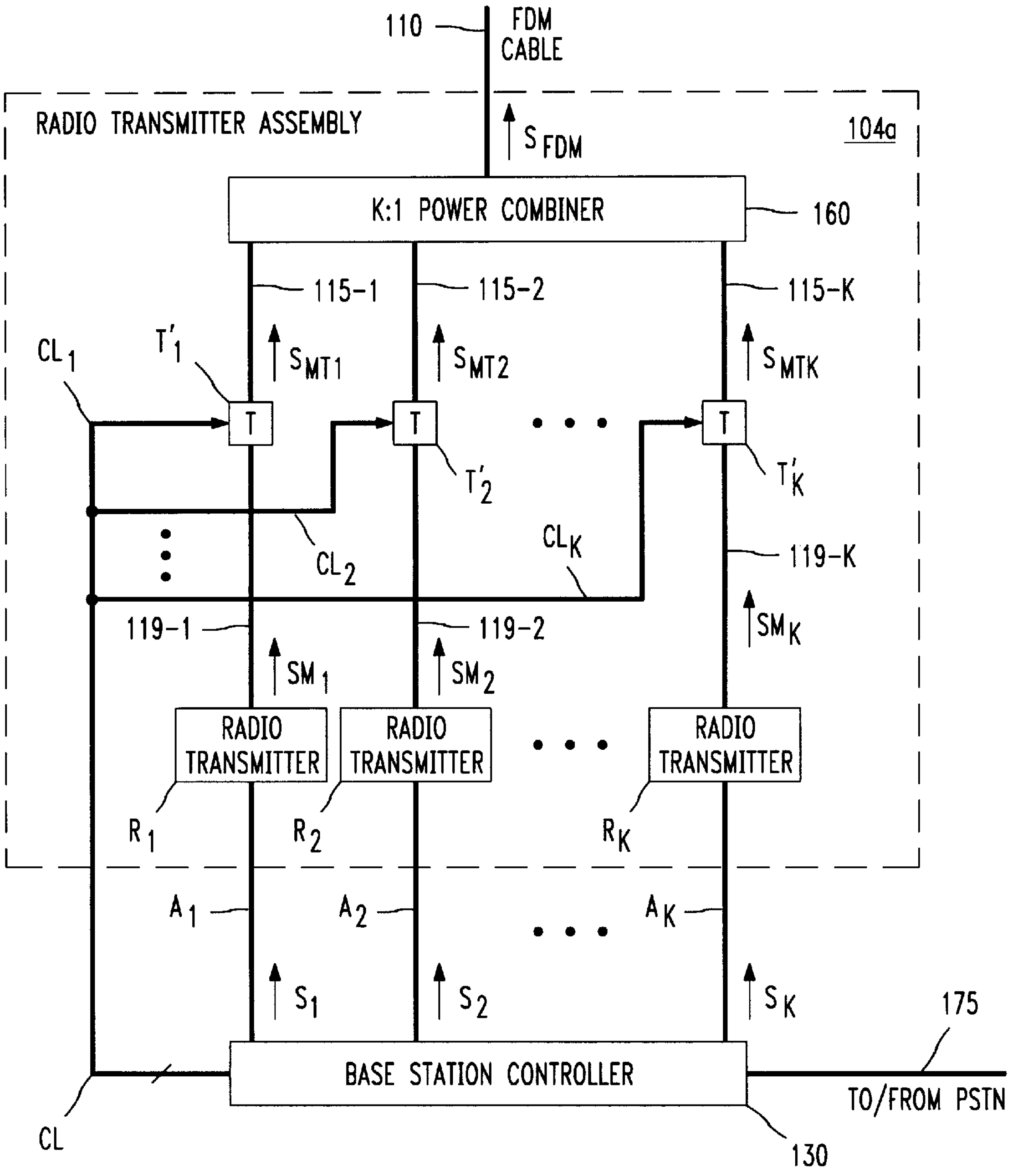
FIG. 1B shows a block diagram of a radio transmitter assembly.

FIG. 1B schematically illustrates an exemplary radio transmitter assembly 104$a$. Radio transmitters $R_1$ to $R_K$ receive baseband information-bearing signals $S_1$ to $S_K$, respectively, from base station controller 130 on respective lines $A_1$ to $A_K$. Each radio transmitter $R_1$ to $R_K$ generates a carrier signal, which is modulated therein by the respective baseband signal $S_1$ to $S_K$. The modulated signals are then typically amplified and filtered to produce associated modulated radio output signals $SM_1$ to $SM_K$. Typically, each of the radio output signals $SM_1$ to $SM_K$ have the same carrier frequency $f_C$. Suitable modulation techniques that can be employed within the radio transmitters include those established for the Advanced Mobile Phone System (AMPS), IS-54 and IS-94 industry standards, each of which uses frequency modulation (FM). Digital modulation techniques such as frequency shift keying (FSK) or phase shift keying (PSK) are other suitable examples. CDMA or TDMA can also be employed—in either of these cases, each radio transmitter $R_i$ would be used to modulate a plurality of information-bearing signals, such that the number of radios would be less than the number of signals capable of being transmitted.

Radio output signals $SM_1$ to $SM_K$ are applied to tunable frequency translators $T_1'$ to $T_K'$, respectively, via respective lines 119-1 to 119-K. Each frequency translator $T_1'$ to $T_K'$ translates the associated radio output signal to a selected frequency-delimited channel controlled by base station controller 130 via control signals on associated control lines $CL_1$ to $CL_K$. Modulated, frequency translated output signals are thereby provided on lines 115-1 to 115-K, and applied to K:1 power combiner 160, which combines the signals to form signal $S_{FDM}$ on FDM cable 110.

Figure 2A:
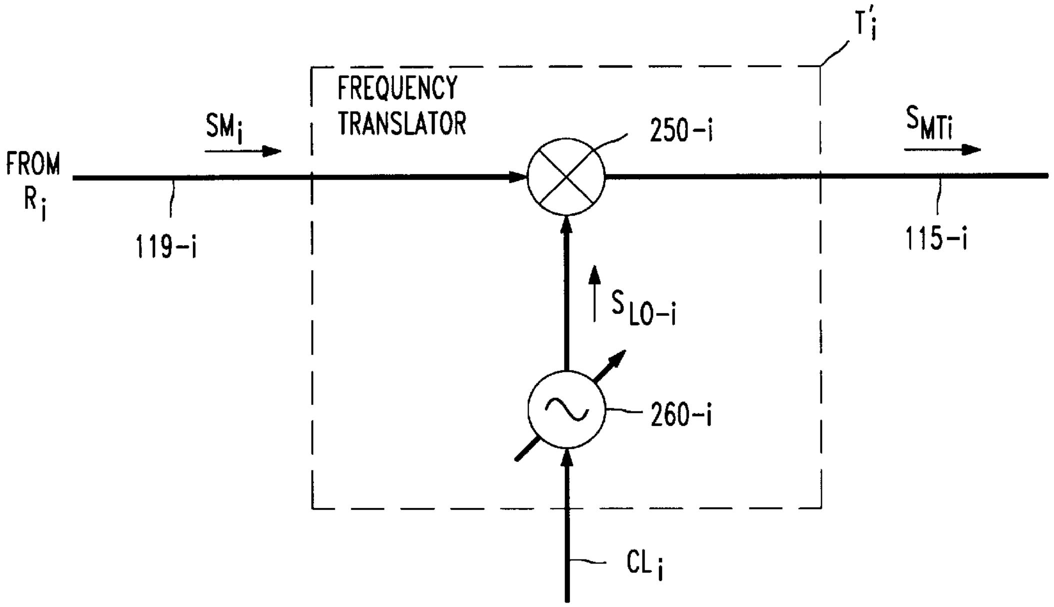
FIGS. 2A and 2B are schematic diagrams of frequency translators.

Referring to FIG. 2A, an exemplary frequency translator $T_i'$ can be used for any of frequency translators $T_1'$-$T_K'$ of radio transmitter assembly 104*a*. Up-converting mixer 250-*i* receives, from the corresponding radio transmitter $R_i$, the associated modulated signal $SM_i$ having a carrier frequency $f_c$. Mixer 250-*i* also receives a sinusoidal local oscillating (L.O.) signal $S_{LO}$-i from tunable frequency synthesizer 260-*i*. The frequency $f_{LOi}$ of signal $S_{LO}$-i is controlled by a control signal on line $CL_i$ supplied from the base station controller. Mixer 250-*i* mixes signal $S_{LO}$-i with signal $SM_i$ to produce a frequency translated signal $S_{MTi}$ on line 115-*i*, which has a carrier frequency equal to ($f_{LOi}$–$f_C$) By tuning each synthesizer 260-1 to 260-K to a different frequency, separated by more than the signal bandwidth of each modulated signal $SM_i$, signals $S_{MT1}$ to $S_{MTK}$ can each occupy a distinct band-limited channel, e.g., 30 KHz wide. In this manner, when signals $S_{MT1}$ to $S_{MTK}$ are combined to form FDM signal $S_{FDM}$, no interference between channels will result. As the base station controller controls the L.O. frequencies within the individual frequency translators $T_1'$ to $T_M'$, the frequency channels designated for subsequent radiation can be dynamically allocated to any of the information-bearing signals.

Figure 8A:
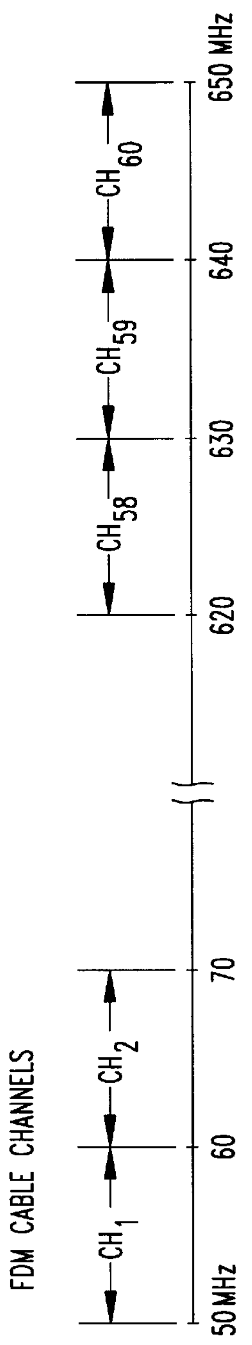
FIGS. 8A and 8B respectively show exemplary frequencies that can be used for FDM cable channels and for radiation channels.
Figure 8B:
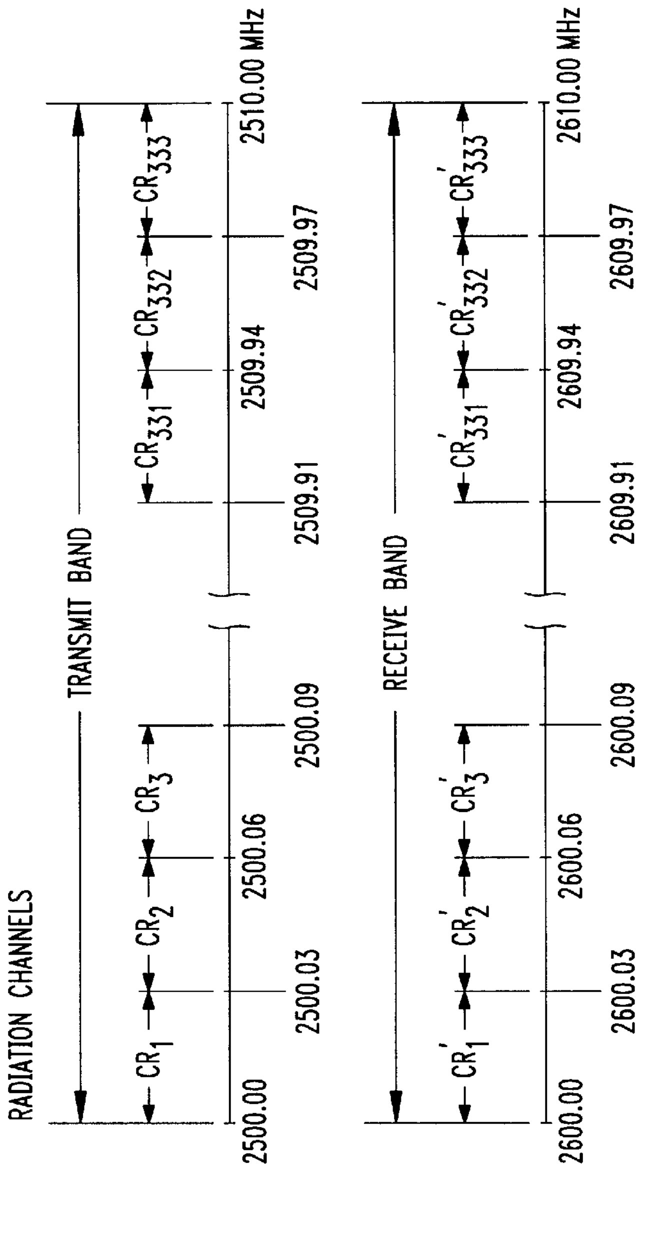

By way of example, signals $S_{MT1}$ to $S_{MTK}$ can be placed anywhere within a 50–650 MHz frequency range on the FDM cable, but will be subsequently radiated over a much narrower frequency band, e.g., between 2500 to 2510 MHz. This exemplary case is illustrated in FIGS. 8A and 8B. In this example, 60 FDM cable bands (or sub-bands) $CH_1$ to $CH_{60}$ are created, each 10 MHz wide. Each FDM cable band is associated with only one of 60 narrow antenna beams $B_1$ to $B_{60}$ to be formed. Thus, any of signals $S_{MT1}$ to $S_{MTK}$ (FIG. 1B) placed within a particular FDM cable band will be radiated only on the antenna beam associated with that band. As shown in FIG. 8B, 333 radiation channels $CR_1$ to $CR_{333}$ can be established on transmit (including control channels), each 30 KHz wide, and each capable of accommodating any of signals $S_{MT1}$ to $S_{MTK}$. The radiation channels on transmit fall within the common radiation band of 2500–2510 MHz. It is understood that other frequencies can be used on the FDM cable and for the radiation channels. Each beam (and associated FDM cable channel) typically has at least one narrowband control channel dedicated for call setups with wireless terminals. In an extreme case, all the mobile wireless terminal users can be located, at any given time, within a single angular sector covered by only one of antenna beams $B_1$ to $B_M$. In this scenario, each mobile user can be communicated with by placing all signals $S_{MT1}$ to $S_{MTK}$ within the 10 MHz wide FDM cable band associated with that antenna beam, e.g., within 50–60 MHz ($CH_1$) for the beam $B_i$ associated with $CH_1$, and then radiating those signals via beam $B_i$ in selected 30 KHz channels within the 2500–2510 MHz band.

Also shown in FIG. 8B are exemplary receive channels $CR_1'$ to $CR_{333}'$ within an illustrative receive band of 2600–2610 MHz. Each receive channel $CR_i'$ is used for voice/data transmission by a wireless terminal, and is offset by a fixed frequency from the corresponding transmit channel $CR_i$ that the wireless terminal receives from the base station (In this example, the offset is 100 MHz). In general, the receive band preferably does not overlap the transmit band. The receive case will be discussed in more detail below.

Figure 2B:
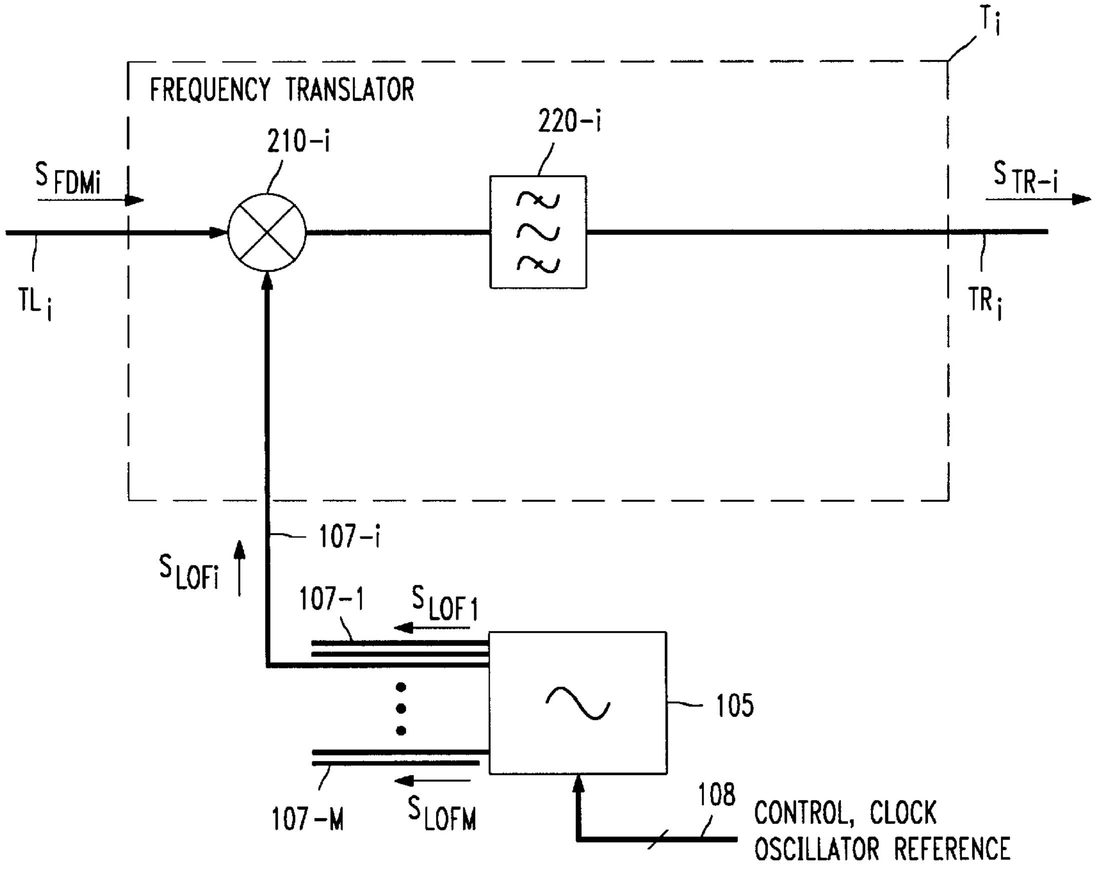

FIG. 2B shows an exemplary frequency translator $T_i$, which can be used for any of frequency translators $T_1$ to $T_M$ of transmitter subassembly 102. Signal $S_{FDMi}$, present on associated input line $TL_i$, is applied to a first input port of up-converting mixer 210-*i*. Signal $S_{FDMi}$ is a multi-carrier signal comprised of signals $S_{MT1}$ to $S_{MTK}$ at respective carrier frequencies ($f_{LO1}$–$f_C$) to ($f_{LOK}$–$f_C$). L.O. signals $S_{LOF1}$ to $S_{LOFM}$, each of a different frequency, are provided by common frequency synthesizer 105 on lines 107-1 to 107-M, respectively. Synthesizer 105 receives a clock oscillator reference on one of lines 108 from the base station controller to enable the synthesized L.O. frequencies $S_{LOF1}$ to $S_{LOFM}$ to be precisely generated. Synthesizer 105 also receives control signals on lines 108 from the base station controller to control which L.O. frequency is provided on which line 107-1 to 107-M. Preferably, a predetermined L.O. frequency is permanently assigned to each frequency translator $T_1$ to $T_M$. In the alternative, the L.O. frequencies can be dynamically altered under the control of the base station controller.

L.O. signal $S_{LOFi}$, which has a frequency $f_{Li}$, is applied via line 107-*i* to the other input port of mixer 210-*i*. The frequency $f_{Li}$ is selected such that only signals within an associated one of FDM cable bands $CH_1$ to $CH_M$ is translated by mixer 210-*i* to fall within the common radiation band for the system, e.g., 2500 to 2510 MHz. Preferably, bandpass filter 220-*i* is employed to filter out frequencies outside of the common radiation band to produce a filtered output signal $S_{TR}$-i on line $TR_i$. By way of example, referring to FIGS. 8A and 8B in conjunction with FIG. 2B, if i=2 and band $CH_2$ is selected as being associated with beam $B_2$ (and translator $T_2$) then translator $T_2$ would up-convert the $CH_2$ band of 60–70 MHz to the common radiation band of 2500–2510 MHz. In this case, $f_{L2}$–65 MHz=2505 MHz, so that $f_{L2}$=2570 MHz.

Figure 3:
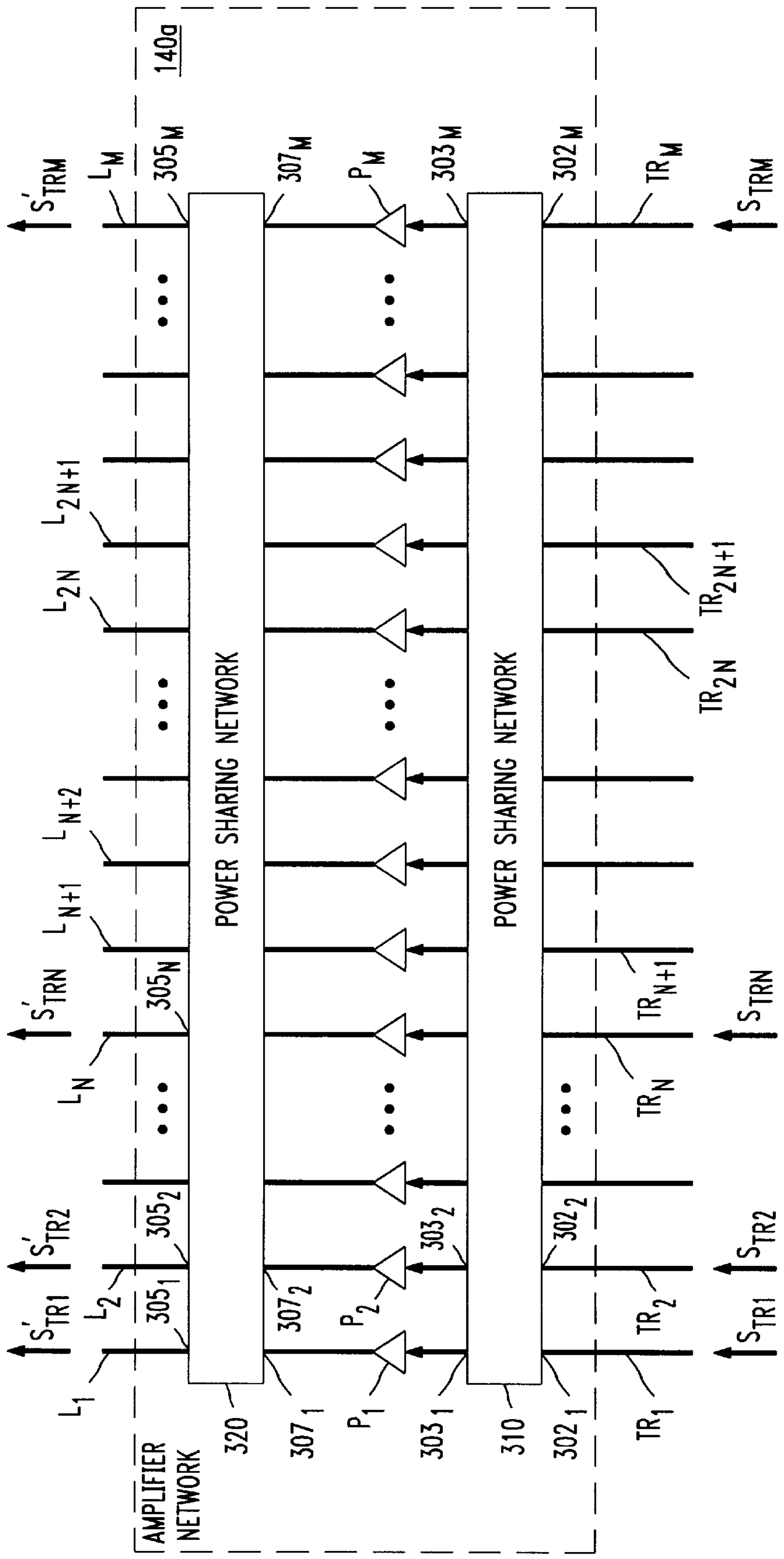
FIG. 3 schematically illustrates an exemplary amplifier network.

FIG. 3 shows an exemplary amplifier network 140*a*, which is an embodiment of amplifier network 140 of FIG. 1A. Amplifier network 140*a* is a power sharing amplifier network, including M amplifiers $P_1$ to $P_M$, each of which amplifies a substantially equal amount of power. Amplifier networks of this type have been described in commonly assigned, co-pending patent application Ser. No. 08/506,286, the subject matter of which is incorporated herein by reference.

Briefly, first power sharing network 310 includes M input ports 302$_1$ to 302$_M$ respectively coupled to lines $TR_1$ to $TR_M$. Each modulated information-bearing signal $S_{TR1}$ to $S_{TRM}$ is split by first power sharing network 310 among output ports 303$_1$ to 303$_M$, with a predetermined phase relationship therebetween. This forms a composite signal on each output port 303$_1$ to 303$_M$ having signal power of all signals $S_{TR1}$ to $S_{TRM}$. Each composite signal is amplified by an associated amplifier $P_1$ to $P_M$ to produce an amplified composite signal, which is applied to an associated input port 307$_1$ to 307$_M$ of second power sharing network 320. Network 320 reconstructs the amplified composite signals to form signals $S_{TR1}'$ to $S_{TRM}'$ on respective output ports 305$_1$ to 305$_M$, which connect to lines $L_1$ to $L_M$, respectively. Signals $S_{TR1}'$ to $S_{TRM}'$ are thus amplified versions of signals $S_{TR1}$ to $S_{TRM}$, respectively. It is noted that M=3N in FIG. 3, such that three exemplary multi-beam antenna arrays can each be coupled to N output ports such as 305$_1$ to 305$_N$, as will be illustrated further below.

Power sharing networks 310 and 320 may each be $Log_2M$-stage Butler Matrices, with power sharing network 320 being the inverse of network 310. This can be accomplished by using the same Butler Matrix for each power sharing network, but with the input and output ports reversed. Butler Matrices and their operation are well known in the art—see, for example, "Antenna Engineering Handbook", chapter 20, by R. Johnson, McGraw Hill Publishing Co., 3rd edition. Alternatively, power sharing networks 310 and 320 may be each comprised of a network of quadrature hybrid couplers, arranged to allow analogous sharing of average signal power among amplifiers $P_1$ to $P_M$, and subsequent reconstruction of the amplified signals.

Figure 4:
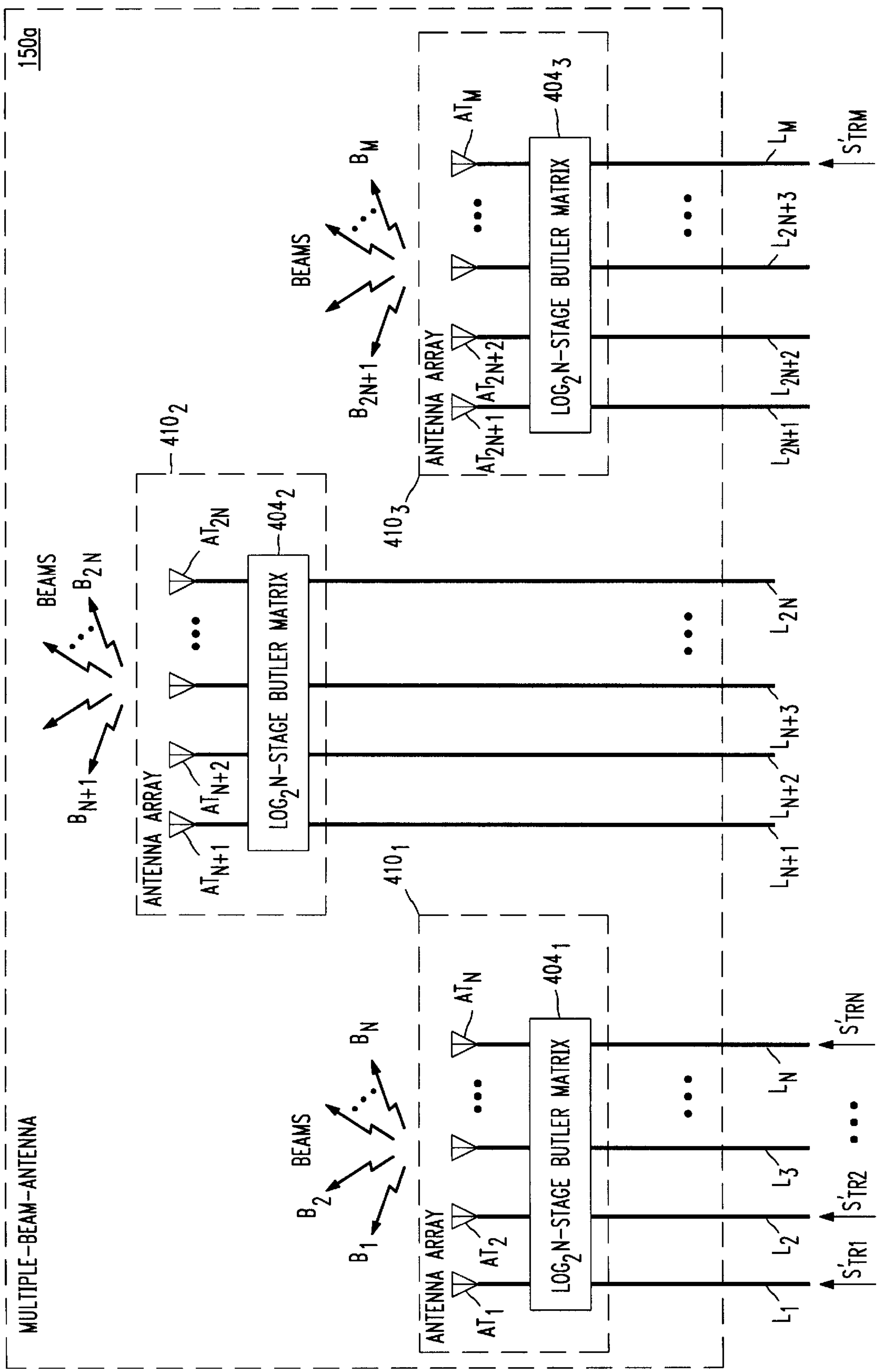
FIG. 4 shows a schematic diagram of an exemplary multiple-beam-antenna.

FIG. 4 schematically illustrates an exemplary multiple-beam antenna 150*a*, which is an embodiment of multiple-beam-antenna 150 of FIG. 1A. Multiple-beam antenna 150*a* is comprised of three antenna arrays $\mathbf{410}_1$ to $\mathbf{410}_3$, each pointing in a different angular direction, such that each antenna array produces multiple beams within a designated angular sector. For instance, antenna arrays $\mathbf{410}_1$ to $\mathbf{410}_3$ can be planar arrays pointing in azimuth angle directions spaced 120° from each other. By proper design of each radiating element $AT_i$ and of the spacing between adjacent radiating elements, each array can produce N narrow beams to cover corresponding 120° angular sectors in azimuth, thereby providing 360° of azimuthal coverage. It is understood that other choices can be made for the number of antenna arrays employed to provide such beam coverage. Some overlap between adjacent beams is necessary to enable a wireless terminal situated between beams to communicate via one of the adjacent beams.

In areas of varying terrain, additional antenna arrays could be provided to cover corresponding elevation angle sectors. Any of these arrays could then be switched to, depending on the terrain for which the transmitting system covers. For example, a total of 12 antenna arrays $\mathbf{410}_i$ could be employed, each covering a two degree elevation sector and a 120° azimuthal sector. In each 120° azimuthal sector, one of the arrays can be switched to, in order to cover a selected one of the elevation sectors.

Each antenna array $\mathbf{410}_1$, to $\mathbf{410}_3$ includes, in the present example, an associated $Log_2N$-Stage Butler Matrix $\mathbf{404}_1$ to $\mathbf{404}_3$ to form the respective beams. Butler Matrices $\mathbf{404}_1$ to $\mathbf{404}_3$ each have N input ports coupled to lines ($L_1$ to $L_N$), ($L_{N+1}$ to $L_{2N}$) and ($L_{2N+1}$ to $L_M$), respectively, with associated signals $S_{TR1}'$ to $S_{TRM}'$ present thereon. In this example, M=3N. Antenna array $\mathbf{410}_1$ further includes N broad beam antenna elements $AT_1$ to $AT_N$ arranged in a line array, and coupled to N corresponding output ports of Butler Matrix $\mathbf{404}_1$, to radiate beams $B_1$ to $B_N$. Beams $B_1$ to $B_N$ radiate signals $S_{TR1}'$ to $S_{TRN}'$, respectively. Analogously, arrays $\mathbf{410}_2$ and $\mathbf{410}_3$ include broad beam antenna elements $AT_{N+1}$ to $AT_{2N+}$, and $AT_{2N+1}$ to $AT_M$, respectively, coupled to respective Butler Matrices $\mathbf{404}_2$ and $\mathbf{404}_3$, to radiate beams $B_{N+1}$ to $B_{2N}$, and $B_{2N+1}$ to $B_M$, respectively. Beams $B_{N+1}$ to $B_M$ radiate signals $S_{TRN+1}'$ to $S_{TRM}'$, respectively. Typically, with this configuration, adjacent beams such as $B_1$, and $B_2$ will overlap such that the power of each beam at the cross-over points will be about −4 dB relative to the power at each beam's peak. This "scalloping loss" of 4 dB at the cross-over points can be reduced to about 1 dB, for example, by adding additional input and output ports to the Butler Matrices of the antenna arrays, to form beams pointing midway between the original beams.

As discussed above, each beam $B_1$ to $B_M$ is preferably dedicated to radiating signals within a permanently assigned FDM cable frequency channel. In an illustrative example, M can equal 60, such that multiple beam antenna 150*a* produces 60 beams, with 20 beams per antenna array. In this case, each beam $B_1$ to $B_{60}$ can have a 3 dB beamwidth of six degrees, to provide information-bearing signals primarily within an associated six degree wide azimuthal angular sector. In the example of FIGS. 8A and 8B, all beams $B_1$ to $B_{60}$ radiate signals in the 2500–2510 MHz band; however, beam $B_1$ radiates only the signals carried on one FDM cable channel such as $CH_1$; beam $B_2$ radiates signals carried on another FDM cable channel such as $CH_2$; and so forth.

It is noted that multiple-beam-antenna 150 of FIG. 1A could alternatively be embodied as M narrow beam antennas, each coupled to one of lines $L_1$ to $L_M$, and each producing one beam. This approach is not preferred, since each of these single beam antennas would require as much space as each multibeam antenna $\mathbf{410}_i$ to produce the same narrow beamwidth, thereby substantially increasing the antenna space requirements.

Figure 5:
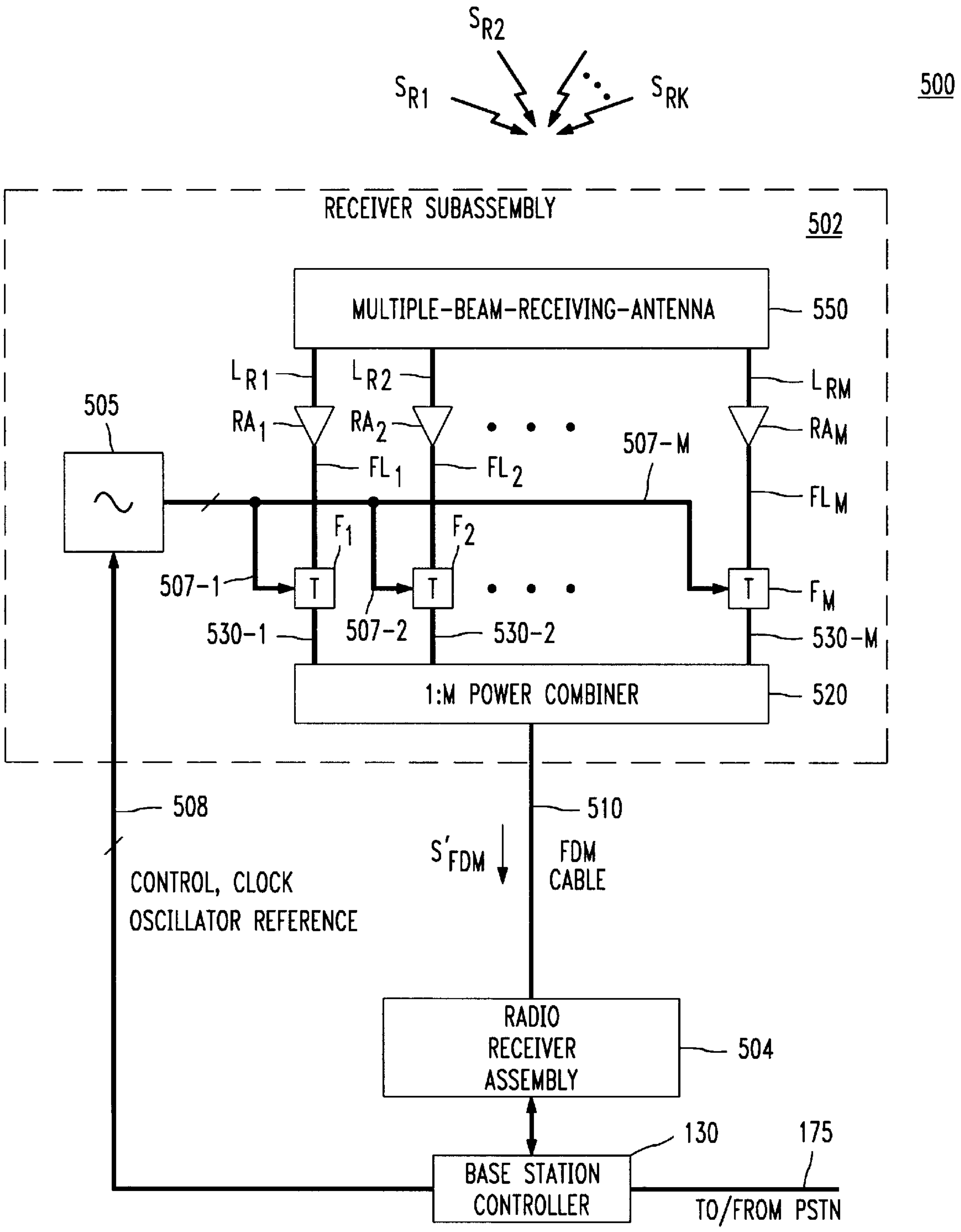
FIG. 5 is a block diagram of a receiving system in accordance with the subject invention.

FIG. 5 shows a receiving system in accordance with the present invention, designated generally as 500, which can be used in conjunction with transmitter assembly 100 of FIG. 1A. Receiving system 500 includes receiver subassembly 502 and radio receiver assembly 504 interconnected by FDM cable 510, and base station controller 130 coupled to assembly 504. FDM cable 510 is typically a low loss, highly shielded coaxial cable. Subassembly 502 is particularly suitable for deployment at the top of a base station tower whereas radio receiver assembly 504 can be employed within an equipment shelter at the bottom of the tower.

Receiver subassembly 502 includes multiple-beam-receiving-antenna 550, which can be a distinct antenna, but which preferably shares a common antenna aperture and beam-forming network with transmitting antenna 150 of FIG. 1A (as will be discussed further below in relation to FIG. 10). In either case, receiving antenna 550 forms substantially the same multiple beams $B_1$ to $B_N$ as transmitting antenna 150. Receiving antenna 550 receives signals $S_{R1}$ to $S_{RK}$ originating from wireless terminals that may be located in random azimuth and elevation directions in relation to the base station. The variable K generally corresponds to the number of information signals on transmit as well as on receive, and is typically greater than the number M of beams. As mentioned above, each receive channel (i.e., the frequency channel transmitted by a wireless terminal) is preferably offset by a fixed frequency from the frequency channel transmitted by the base station to that wireless terminal (e.g., by a 100 MHz offset in the example of FIG. 8B). Each receiving beam $B_1$ to $B_M$ receives primarily the signals originating from the angular sector covered by a predetermined portion of that beam's main lobe. When a wireless terminal is positioned between overlapping beams, the beam that provides superior signal quality can be selected at any given time for communication with that wireless terminal, using a technique to be described below.

Figure 9:
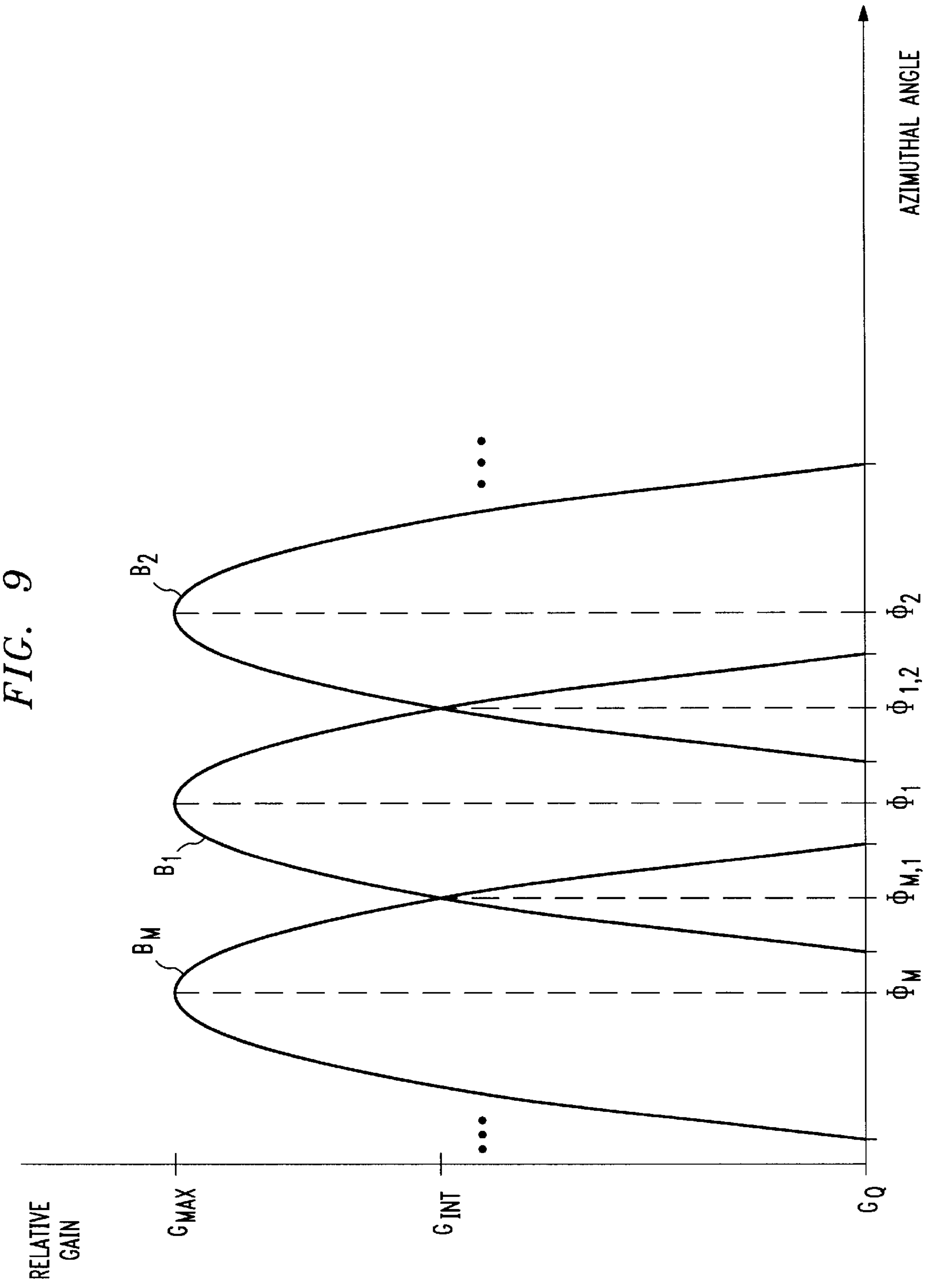
FIG. 9 is an illustration of overlapping antenna beams.

Receiving antenna 550 provides received signals $S_{R1}$ to $S_{RK}$ on lines $L_{R1}$ to $L_{RM}$, where the power distribution of these signals among lines $L_{R1}$ to $L_{RM}$ depends upon the angular position of the wireless terminals transmitting the signals, and the extent of the overlap between adjacent beams of antenna 550. By way of illustration, FIG. 9 shows radiated or received power vs. azimuth angle of three adjacent antenna beams, $B_M$, $B_1$ and $B_2$. The peaks of beams $B_M$, $B_1$ and $B_2$ point at angles $\Phi_M$, $\Phi_1$ and $\Phi_2$, respectively, where relative beam gain of the respective beam is a maximum of $G_{max}$, and where relative gain of the adjacent beams are below a level $G_Q$. Relative gain $G_Q$ depends on the extent of the overlap between the beams, and is typically 20 to 40 dB below the gain at the beam peaks. The respective beams intersect at angles $\Phi_{m,1}$ and $\Phi_{1,2}$, where relative gain is $G_{INT}$. The intersection angles define the edges of azimuthal sectors associated with each beam.

With continuing reference to FIG. 5 in conjunction with FIG. 9, it is assumed that a wireless terminal $W_A$ (not shown)

positioned at angle $\Phi_1$ transmits signal $S_{R1}$. In this case, since adjacent beam field strength is below the gain level $G_Q$, signal $S_{R1}$ is received primarily only on beam $B_1$ and appears primarily on line $L_{R1}$. Analogously, if signal $S_{R2}$ is transmitted by wireless terminal $W_B$ (not shown) from angular position $\Phi_2$, it will appear primarily on line $L_{R2}$, and so on. If wireless terminal $W_A$ moves to a position at beam intersection angle $\Phi_{1,2}$ and continues to transmit $S_{R1}$, the received signal appears with approximately equal power on both lines $L_{R1}$ and $L_{R2}$. An analogous signal distribution will occur if terminal $W_B$, which is transmitting signal $S_{R2}$, moves to the intersection angle $\Phi_{1,2}$. If wireless terminal $W_A$ continues to move towards angle $\Phi_2$, communication with this wireless terminal can be switched to beam $B_2$ without changing the radiated frequency channel being used for the communication session. On the transmit side, this is accomplished by shifting the frequency of the L.O. signal $S_{LO}$-i (FIG. 2A) and, hence, of modulated signal $S_{MT1}$, so that it falls within the FDM cable channel associated with beam $B_2$. If the L.O. frequency is shifted by the spacing between FDM cable channels, e.g., by 10 MHz in the example of FIG. 8A, the same radiated frequency channel is maintained. Similar switching is performed on the receive side, as will become apparent below.

The received signals on lines $L_{R1}$ to $L_{RM}$ are typically filtered by bandpass filters (not shown) each having a passband corresponding to the radiation band on receive for the system, e.g., 2600–2610 MHz in the example of FIG. 8B. The filtered signals are then amplified by receiving preamplifiers $RA_1$ to $RA_M$, respectively, and applied to respective frequency translators $F_1$ to $F_M$. Each frequency translator $F_1$ to $F_M$ down-converts the amplified signal to an appropriate FDM cable frequency channel, e.g., one of channels $CH_1$ to $CH_M$ of FIG. 8A. Preferably, the same FDM cable channel associated with a given beam is used for both transmit and receive. Down-conversion to different FDM cable channels is accomplished by locking each frequency translator $F_1$ to $F_M$ to a different synthesized L.O. frequency derived from common frequency synthesizer 505 via a corresponding one of control lines 507-1 to 507-M. Synthesizer 505 is in turn locked to the reference oscillator in base station controller 130 via one of lines 508. Typically, the different L.O. frequencies on lines 507-1 to 507-M are fixed, and only the L.O. frequencies of the frequency translators at the bottom of the tower are changed to accomplish the switching. It is understood, however, that the tower top oscillator frequencies could be dynamically alterable in other embodiments to provide enhanced flexibility.

The circuit arrangement for translator $T_i$ of FIG. 2B can be used for any of frequency translators $F_1$ to $F_M$ with the exception that the bandpass filter 220-*i* is optional since bandpass filtering was already performed. The orientation would be as follows: clock oscillator 505 replaces clock oscillator 105; lines 507-1 to 507-M replace lines 107-1 to 107-M, respectively; line $FL_i$ replaces line $TL_i$; and line 530-*i* replaces line $TR_i$.

The frequency translated signals on lines 530-1 to 530-M are applied to 1:M power combiner 520, which combines the signals to form an FDM receive signal $S_{FDM}'$ on cable 510. This signal is supplied to radio receiver assembly 504, where the received information-bearing signals within the FDM signal are extracted, demodulated and further conditioned for subsequent transmission to the PSTN via base station controller 130.

Figure 6:
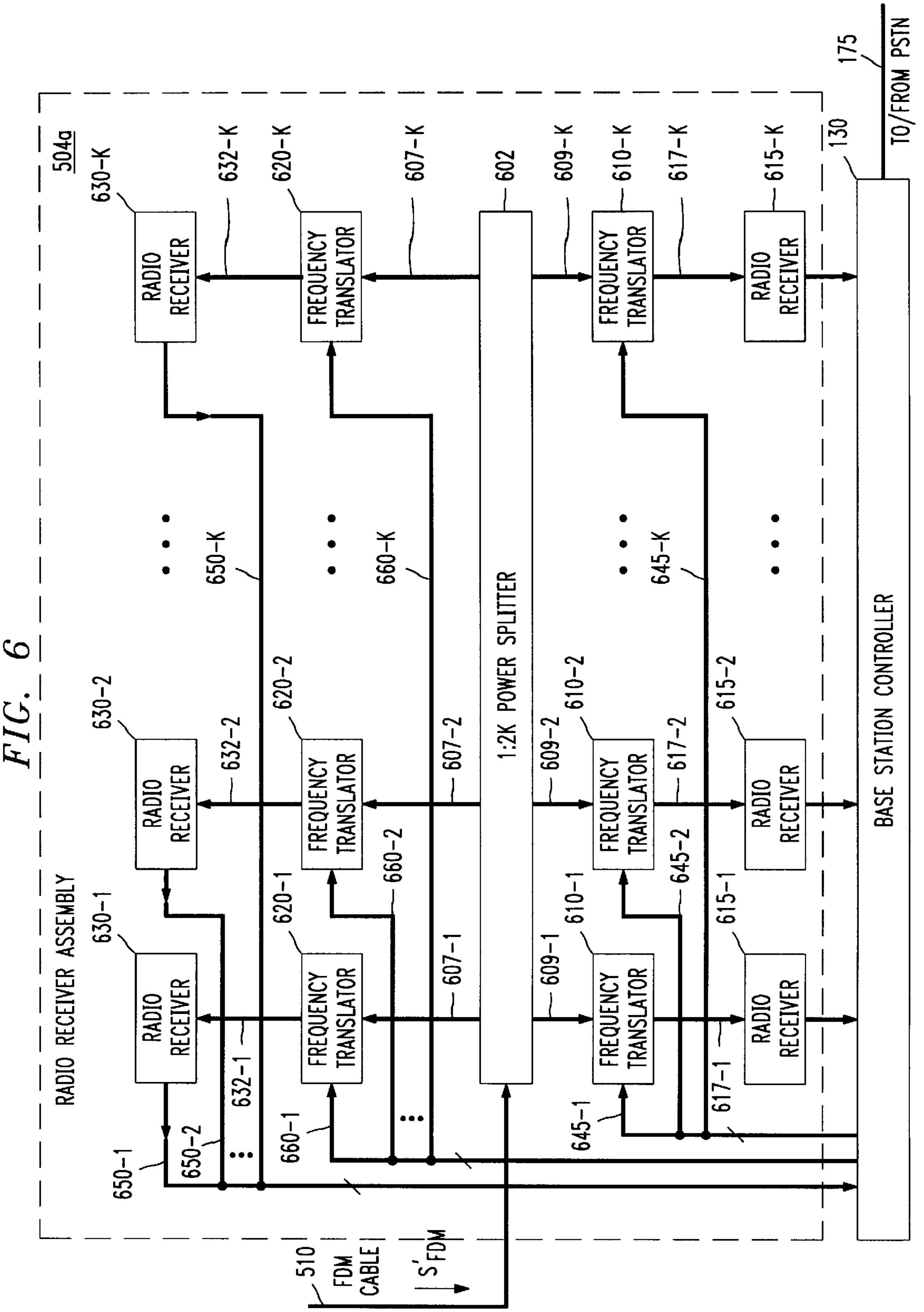
FIGS. 6 and 7 are schematic block diagrams of exemplary radio receiver assemblies.

FIG. 6 shows a schematic block diagram of an illustrative radio receiver assembly 504*a*, which is an embodiment of radio receiver 504 of FIG. 5. Signal $S_{FDM}'$ on FDM cable 510 is applied to 1:2K power splitter 602, which splits up the signal among lines 607-1 to 607-K and 609-1 to 609-K. The signal on each of these lines is thus an attenuated version of the $S_{FDM}'$ signal. Frequency translators 610-1 to 610-K, which are respectively coupled to lines 609-1 to 609-K, each function to down-convert the FDM signal by a different frequency shift so that each translator translates a different information-bearing signal or signals within the FDM signal to a preselected common band. The frequency shift of each translator 610-1 to 610-K is controlled by a control signal on respective lines 645-1 to 645-K provided by base station controller 130. Radio receivers 615-1 to 615-K can then each utilize a narrowband filter having a passband corresponding to this preselected common band to thereby each isolate a different down-converted information-bearing signal or signals.

Radio receivers 615-*i* then typically amplify and demodulate the signals and supply demodulated output signals to base station controller 230. If CDMA or TDMA schemes are being used, each radio receiver 615-*i* would be dedicated for receiving a plurality of information-bearing signals within the common band, whereby radio receiver assembly 504*a* could receive considerably more than K information-bearing signals. In the case of CDMA, each receiver would extract the individual information signals by decoding the chip codes of each received signal. In any case, the base station controller further conditions the demodulated signals and places them on the proper wireline and/or time division multiplexed time slot and/or PSTN FDM channel for transmission to the PSTN as telephonic information-bearing signals.

Radio receiver assembly 504*a* also includes additional frequency translators 620-1 to 620-M and radio receivers 630-1 to 630-K, which function together to determine a suitable or optimum antenna beam for each wireless terminal user. In the embodiment of FIG. 6A, frequency translators 620-1 to 620-K are associated with translators 610-1 to 610-K, respectively, and also with radio receivers 615-1 to 615-K, respectively, in the following manner. An attenuated version of the FDM receive signal $S_{FDM}'$ is applied to frequency translators 620-1 to 620-K via respective lines 607-1 to 607-K. The frequency shifts of these frequency translators are controlled by control signals on lines 660-1 to 660-K supplied by base station controller 130. The control signal on each of these lines is periodically changed to cause the frequency shift provided by each frequency translator 620-*i* to be periodically stepped. The frequency step preferably corresponds to the spacing "$F_{sp}$" between FDM cable frequency channels, for instance, 10 MHz in the example of FIG. 8A. The actual frequency shift at any given time of a particular translator 620-*i* is preferably equal to the frequency shift of the associated translator 610-*i* plus or minus (N x $F_{SP}$) where N is an integer.

The frequency translated output of each translator 620-*i* on line 632-*i* is provided to associated radio receiver 630-*i*, which has a narrowband filter (not shown) at its input. By utilizing the frequency shifts indicated above for translators 620-*i*, and by using the same passband for these narrowband filters as is used those of by receivers 615-*i*, the information-bearing signal received by each receiver 630-*i* is the same as that for the associated receiver 615-*i*. However, as the frequency shifts of translators 620-*i* are stepped by frequency $F_{SP}$, receiver 630-*i* receives that information-bearing signal on an adjacent antenna beam. Each radio receiver 630-*i* then supplies an output signal indicative of the received signal strength to base station controller 130 on a corresponding line 650-*i*. In this manner, a superior antenna beam can be chosen by the base station controller for the communication session. When it is determined that the presently used antenna beam is no longer the best choice, and an adjacent beam is superior, base station controller 130 changes the control signal to frequency translator 610-*i* to change its frequency shift by $F_{sp}$ and thereby switch the communication session to the adjacent beam. With this approach, the same radiated frequency channel continues to be used even though the communication session is switched to another beam.

For example, referring to FIGS. 8A and 8B, it is supposed that a mobile user communicating with receiver 615-*i* on beam $B_{58}$ (associated with FDM cable channel $CH_{58}$, for example) is transmitting to the base station on frequency channel $CR_1'$, i.e., 2600.00–2600.03 MHz. The base station transmits to the mobile user's wireless terminal on transmit channel $CR_1$ (2500.00–2500.03 MHz). In this case the portion of the incoming signal received by the base station on beam $B_{58}$ occupies the frequency slot from 629.97 to 630.00 MHz on FDM cable 510, as a result of the frequency translation of translator $F_{58}$. Meanwhile, the frequency slot on cable 510 from 639.97 to 640.00 MHz carries the portion of the incoming signal received on beam $B_{59}$, by virtue of the frequency translation of translator $F_{59}$. The frequency shift of translator 620-*i* is stepped to enable receiver 630-*i*, which has a fixed bandpass filter at its input, to isolate the power in only one of these FDM cable slots at a time. When it is determined that the received signal power in slot 639.97–640.00 exceeds that within slot 629.97–630.00, base station controller 130 commands translator 610-*i* to change its frequency shift by 10 MHz to establish communication on beam $B_{59}$. Hence, the same radiated frequency channel on receive of 2600.00 to 2600.03 is maintained even though the beam used for communication has been switched and the FDM cable band used for communication has shifted. Simultaneously, on the transmit side, base station controller 130 changes the frequency shift of the corresponding translator $T_i'$ of FIG. 1B by 10 MHz to enable transmission of the corresponding information signal from the PSTN to be performed on beam $B_{59}$. Since the L.O. frequencies provided to the tower top frequency translators on transmit do not change, the same frequency channel on transmit, $CR_1$, is likewise maintained throughout the communication session.

If code division multiple access is employed, each of receivers 630-1 to 630-K would also sequentially decode the various information signals within the frequency channel isolated in that receiver at any given time. Each receiver 630-*i* would scan the different chip codes under the control of base station controller 130 to obtain a sample of each signal for measurement of its signal strength. Once every signal is sampled, the frequency translator 620-*i* is stepped again to isolate the signals received on the adjacent beam, and the signals are decoded again for measurement. The base station controller then determines which users should be switched to other beams.

It is noted that the decision by the base station controller to switch the communication session to another beam can be based on parameters other than pure received signal strength. For example, the determination can alternatively be based on the measured bit error rate or the measured signal to interference ratio, or on a combination of received signal power with one of these parameters.

It is further noted that one or more of receivers 615-1 to 615-K or 630-1 to 630-K can be dedicated to receiving signals transmitted in control channels during call set-ups. As mentioned above, each antenna beam can have its own narrowband control channel in which call setup information is transferred to and from the wireless terminals and the base station. The base station then commands the wireless terminal to tune to a selected available frequency channel for subsequent communication and assigns an available one of the radio transmitters $R_1$ to $R_K$ and an available receiver 615-*i* for the communication session on the selected channel.

An exemplary circuit arrangement for any of frequency translators 610-1 to 610-K or 620-1 to 620-K is that of translator $T_i'$ shown in FIG. 2A, which uses a tunable local oscillator. Circuit port orientation would be as follows: line 607-*i* or 609-*i* replaces line 119-*i*; line 632-*i* or 617-*i* replaces line 115-*i*; and control line 660-*i* or 645-*i* replaces control line $CL_i$.

Figure 7:
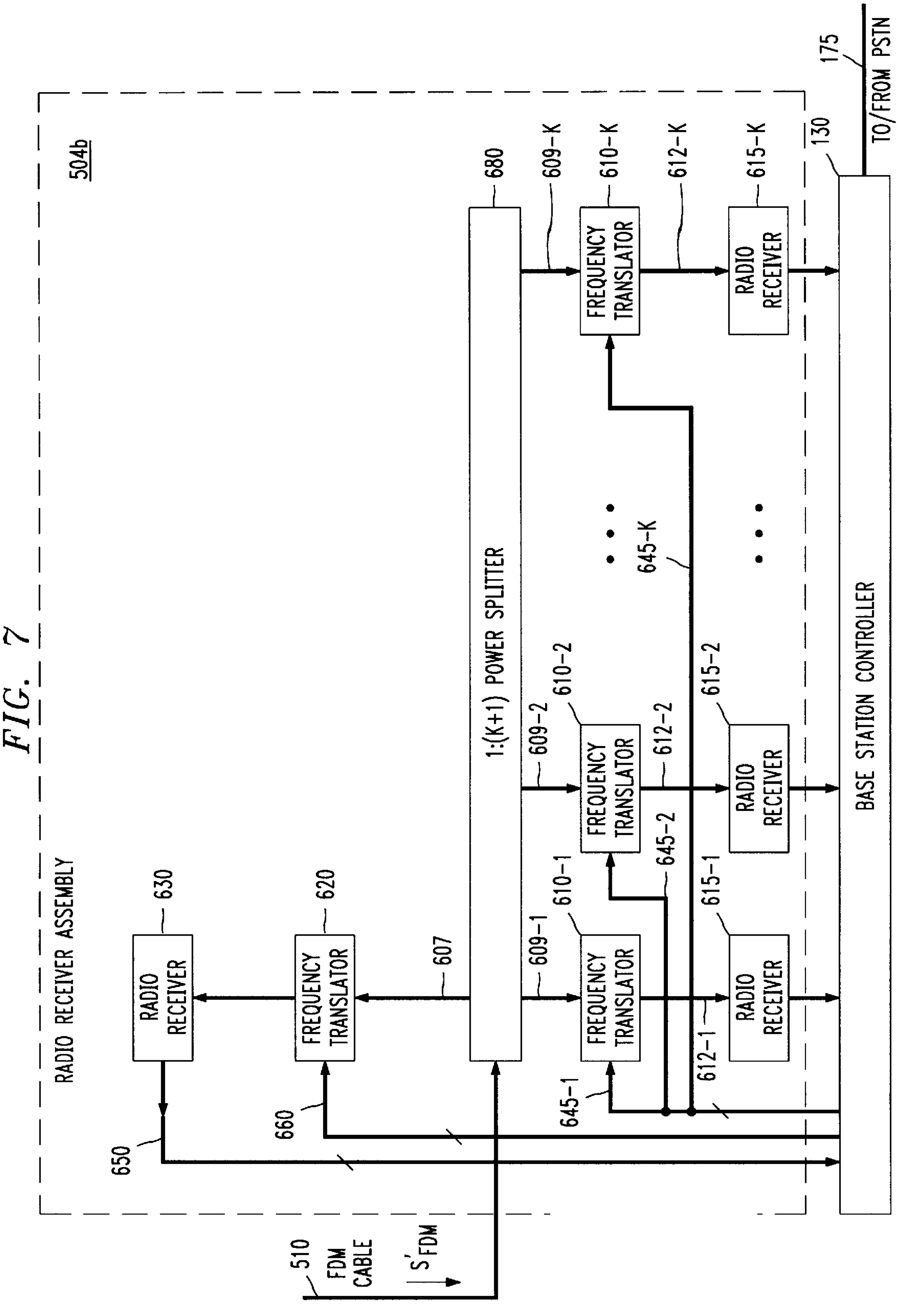

Referring to FIG. 7, an alternative embodiment of radio receiver assembly 504 is shown, designated generally as 504*b*. Operation of receiver assembly 504*b* is the basically the same as that of 504*a* except that a single frequency translator 620 and single "roving" radio receiver 630 is used to find an optimum or suitable beam for each user at any given time. Translator 620 and receiver 630 thus replace translators 610-1 to 620-K and receivers 630-1 to 630-K. Further, 1:(K+1) power splitter 680 replaces 1:2K power splitter 602. The L.O. frequency of translator 620 is stepped in a sequence to enable receiver 630 to determine an optimum or suitable communication beam for one radio receiver 612-*i* at a time. In this manner, receiver 630 is timeshared between all the users. This approach is feasible since frequency translator 630 can step through all the communication channels, and base station controller 130 can process all the data in a timeframe an order of magnitude faster than a mobile traveler can travel between beams.

In an alternative embodiment, the wireless terminals would determine an optimum or suitable antenna beam for the communication session. The wireless terminals would typically need to differentiate between beams, such as by analyzing codes in control channels associated with each beam and by continuously measuring the signal strength of each beam as the wireless terminal position changes.

It is further noted that the use of many narrow antenna beams allows for the employment of frequency reuse in which the same narrowband radiation frequency channels are used by several non-overlapping beams. This approach increases the number of possible simultaneous users of a limited radiation frequency band. Moreover, polarization diversity could also be implemented to increase user capacity.

Figure 10:
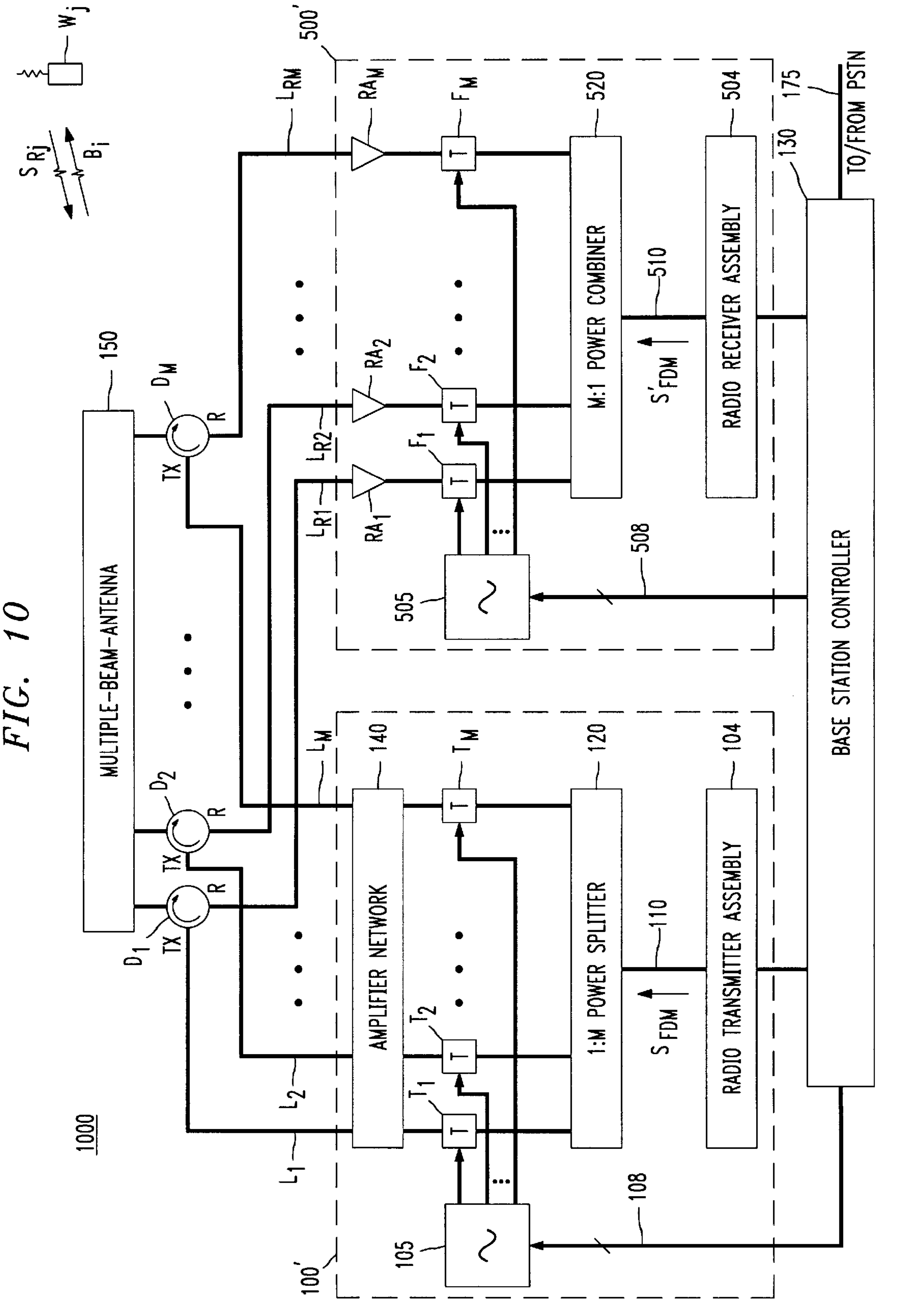
FIG. 10 is a schematic diagram of a wireless telecommunication system in accordance with the present invention.

FIG. 10 schematically illustrates a wireless telecommunication system in accordance with the present invention, designated generally as 1000, which employs a common multiple-beam-antenna 150 for transmit and receive. System 1000 includes transmitting system 100' and receiving system 500', each of which include elements of respective transmitting and receiving systems 100 and 500 discussed above.

As is well known to those skilled in the art, the reciprocity theorem dictates that within the coherence bandwidth, transmitting beam patterns are identical to receiving beam patterns when a common or equivalent antenna aperture and beam forming network are used for transmit and receive. In FIG. 10, antenna 150 is employed to transmit information signals on beams $B_1$ to $B_M$ and to receive signals $S_{R1}$ to $S_{RK}$ transmitted from wireless terminals. An illustrative beam $B_i$ transmits an information signal to wireless terminal $W_j$, which transmits a signal $SR_j$ back to antenna 150 via the same beam $B_i$. Duplexers $D_1$ to $D_M$ each have a transmit port TX coupled to an associated transmit line $L_1$ to $L_M$, and a receive port R coupled to a respective receive line $L_{R1}$ to $L_{RM}$. The duplexers enable simultaneous transmission and reception of signals to take place. Typically, as discussed above, frequency and control channels used for receive are offset from frequency and control channels used on transmit. Transmit lines $L_1$ to $L_M$ connect to transmitting system 100' while receive lines $L_{R1}$ to $L_{RM}$ connect to receiving system 500'. The remainder of the system operates substantially as was described above in relation to transmitting system 100 and receiving system 500.

It will be understood that the embodiments disclosed herein are merely exemplary, including the illustrative frequencies disclosed for the FDM cable channels and radiated frequency channels, and that one skilled in the art can make many modifications and variations to the disclosed embodiments without departing from the spirit and scope of the invention. All such modifications and variations are intended to be included within the scope of the invention as defined by the appended claims.

What is claimed is:

1. A multiple-beam transmitting system for use in a wireless telecommunication system, comprising:

a) a radio transmitter assembly for receiving a plurality of input information-bearing signals and generating therefrom a first frequency division multiplexed (FDM) signal;

b) a transmitter subassembly comprising:

i) a power splitter coupled to said radio transmitter, for splitting said first FDM signal into a plurality of second FDM signals, each being an attenuated version of said first FDM signal;

ii) a plurality of frequency translators coupled to said power splitter, each for frequency translating one of said second FDM signals and thereby placing at least one of said information-bearing signals therein that resides within a predefined portion of a frequency band occupied by said first FDM signal, to within a predetermined translated frequency band; and, iii) a multiple-beam-antenna for radiating a plurality of antenna beams, with each antenna beam transmitting at least one of said information-bearing signals placed by an associated frequency translator within said translated frequency band.

2. The transmitting system according to claim 1, wherein:

said first FDM signal has frequency components within a first frequency range having a plurality M of frequency sub-bands therein;

each of said frequency translators being operative to translate the associated second FDM signal to the same predetermined translated frequency band; and said plurality of antenna beams comprises M antenna beams, with each antenna beam radiating said information-bearing signals that are within an associated one of said M sub-bands of said first FDM signal.

3. The transmitting system according to claim 2, wherein each of said frequency translators is operable to translate the associated second FDM signal by a different frequency shift.

4. The transmitting system according to claim 2, wherein said predetermined translated frequency band has a bandwidth less than the bandwidth of said first frequency range.

5. The transmitting system according to claim 2, wherein each of said frequency sub-bands and said predetermined translated frequency band are of substantially the same bandwidth.

6. The transmitting system according to claim 4, wherein said plurality of input information-bearing signals is greater than said plurality M of antenna beams.

7. The transmitting system according to claim 6, wherein any given one of said antenna beams is operative to radiate substantially all of said input information-bearing signals when substantially all of said information-bearing signals are placed within the sub-band of said first FDM signal associated with said given antenna beam.

8. The transmitting system according to claim 1, wherein said transmitter subassembly further comprises an amplifier network coupled between said frequency translators and said multiple-beam-antenna, for amplifying the signals translated by said frequency translators.

9. The transmitting system according to claim 2, wherein said radio transmitter assembly comprises:

a plurality of radio transmitters, each for receiving at least one of said input information-bearing signals and generating therefrom a modulated radio signal;

a plurality of further frequency translators, each for frequency translating one of said radio signals to a tunable narrow frequency band within said first frequency range, responsive to a control signal applied thereto, to thereby provide a plurality of translated radio signals; and a power combiner for combining said translated radio signals to form said first FDM signal.

10. The transmitting system according to claim 9, wherein said tunable narrow frequency band is about 30 KHz wide.

11. The transmitting system according to claim 9, wherein said transmitter subassembly is disposed at a first equipment location and said radio transmitter assembly is disposed at a second equipment location, and wherein said transmitting system further includes an FDM cable coupling said power combiner of said radio transmitter assembly to said power splitter of said transmitter subassembly, said FDM cable carrying said first FDM signal.

12. The transmitting system according to claim 1, wherein said multiple-beam-antenna comprises a plurality of antenna arrays, each said antenna array including a multiple-beam-forming-network coupled to a plurality of antenna elements, with each said antenna array forming multiple beams within a given angular sector relative to said transmitter subassembly.

13. The transmitting system according to claim 9, further including a base station controller coupled to said radio transmitter assembly, said base station controller operable to receive telephonic information-bearing signals from a telephone network and to provide said input information-bearing signals derived from said telephonic signals to said radio transmitters, said base station controller also operable to supply said control signals to associated ones of said further frequency translators to control said tunable narrow frequency bands.

14. The transmitting system according to claim 2, wherein said transmitter subassembly further includes a frequency synthesizer for providing a plurality of sinusoidal signals at different frequencies, each said sinusoidal signal being provided to one of said frequency translators, each said frequency translator comprising:

a mixer for mixing said associated second FDM signal with an associated one of said sinusoidal signals to produce a frequency translated FDM signal; and a bandpass filter having a passband corresponding substantially to said predetermined translated frequency band, for filtering out frequency components of said translated FDM signal.

15. The transmitting system according to claim 8, wherein said amplifier network comprises:

a first power sharing network having a plurality of first input ports coupled to associated ones of said frequency translators, for splitting each said frequency translated signal among a plurality of first output ports thereof, thereby forming a composite signal on each said first output port having signal power of all said frequency translated signals;

a plurality of amplifiers, each coupled to one of said first output ports, each said amplifier amplifying one of said composite signals to provide an amplified composite signal;

a second power sharing network having a plurality of second input ports, each coupled to an associated one of said amplifiers, for reconstructing each said amplified composite signal to thereby provide a plurality of amplified frequency translated signals on associated second output ports thereof;

said second output ports being coupled to said multiple-beam-antenna, wherein each said amplified frequency translated signal is radiated by an associated one of said antenna beams.

16. The transmitting system according to claim 15, wherein said first and second power sharing networks each comprise a Butler Matrix.

17. The transmitting system according to claim 16, wherein said multiple-beam-antenna comprises a plurality of antenna arrays, each said antenna array including a multiple-beam-forming-network coupled to a plurality of antenna elements, each said multiple-beam-forming-network comprising:

a Butler Matrix having N input ports, with each of said N input ports coupled to one of said second output ports of said second power sharing network, and with each said Butler Matrix having N output ports coupled to associated ones of said antenna elements, and forming N beams with each of said N beams capable of carrying at least one of said amplified frequency translated signals.

18. A wireless telecommunication system, comprising:

A) a multiple-beam transmitting system, including:

i) a radio transmitter assembly for receiving a plurality of input information-bearing signals and generating therefrom a first frequency division multiplexed (FDM) signal;

ii) a transmitter subassembly comprising:

a) a power splitter coupled to said radio transmitter, for splitting said first FDM signal into a plurality of second FDM signals, each being an attenuated version of said first FDM signal;

b) a plurality of first frequency translators coupled to said power splitter, each for frequency translating one of said second FDM signals and thereby placing at least one of said information-bearing signals therein that resides within a predefined portion of a frequency band occupied by said first FDM signal, to within a predetermined translated frequency band;

c) a multiple-beam-antenna for radiating a plurality of antenna beams, with each antenna beam transmitting at least one of said information-bearing signals placed by an associated first frequency translator within said translated frequency band;

B) a receiving system comprising:

i) a receiver subassembly, including:

a) a receiving antenna for forming multiple beams and capable of receiving via said multiple beams a plurality of band-limited incoming signals originating from wireless terminals;

b) a plurality of second frequency translators, each for frequency translating the received incoming signals to provide translated received signals;

c) a power combiner for combining said translated received signals to form a third FDM signal; and ii) a radio receiver assembly coupled to said receiver subassembly, for extracting said received incoming signals from said third FDM signal.

19. The telecommunication system according to claim 18, wherein said multiple-beam-antenna and said receiving antenna comprise a common antenna.

20. The telecommunication system according to claim 18, further comprising a base station controller operable to receive telephonic information-bearing signals from a telephone network and to provide said input information-bearing signals derived from said telephonic signals to said radio transmitter assembly;

said base station controller further operable to receive said incoming signals extracted by said radio receiver assembly and to provide corresponding telephonic signals to said telephone network.

21. The telecommunication system according to claim 18, wherein:

said first FDM signal has frequency components within a first frequency range having a plurality M of frequency sub-bands therein;

each of said first frequency translators being operative to translate the associated second FDM signal to the same predetermined translated frequency band; and said plurality of antenna beams comprises M antenna beams, with each said antenna beam transmitting said information-bearing signals that are within an associated one of said M sub-bands of said first FDM signal.

22. The telecommunication system according to claim 21, wherein said radio transmitter assembly comprises:

a plurality of radio transmitters, each for receiving at least one of said input information-bearing signals and generating therefrom a modulated radio signal;

a plurality of third frequency translators, each for frequency translating one of said radio signals to a tunable narrow frequency band within said first frequency range, responsive to a control signal applied thereto, to thereby provide a plurality of translated radio signals; and a power combiner for combining said translated radio signals to form said first FDM signal.

23. The telecommunication system according to claim 22, wherein said radio receiver assembly comprises:

a further power splitter for splitting said third FDM signal into a plurality of fourth FDM signals each being an attenuated version of said third FDM signal;

a plurality of fourth frequency translators, each for frequency translating one of said fourth FDM signals;

a plurality of radio receivers, each coupled to one of said fourth frequency translators and each for isolating at least one of the incoming signals within the associated translated fourth FDM signal.

24. The telecommunication system according to claim 23, wherein said further power splitter is further operable to split said third FDM signal into a plurality of fifth FDM signals, each being an attenuated version of said third FDM signal, and wherein said radio receiver assembly further comprises:

a plurality of fifth frequency translators, each associated with one of said radio receivers and each operative to frequency translate one of said fifth FDM signals by variable frequency shifts responsive to a control signal applied thereto from a base station controller; and a plurality of additional radio receivers, each coupled to an associated one of said fifth frequency translators and to said base station controller, for measuring received signal power in a predetermined frequency band of the associated translated fifth FDM signal, each said additional radio receiver providing an output signal to said base station controller indicative of the signal power measured to enable said base station controller to determine a suitable one of said antenna beams for each communication session with said wireless terminals.

25. The telecommunication system according to claim 23, wherein said further power splitter is further operable to split said third FDM signal into an additional FDM signal that is an attenuated version of said third FDM signal, and wherein said radio receiver assembly further comprises:

an additional frequency translator operative to frequency translate said additional FDM signal by variable frequency shifts responsive to a control signal applied thereto from a base station controller;

an additional radio receiver coupled to said additional frequency translator and to said base station controller, for measuring received signal power in a predetermined frequency band of the additional translated FDM signal;

said additional radio receiver providing an output signal to said base station controller indicative of the signal power measured to enable said base station controller to determine a suitable one of said antenna beams for each communication session with said wireless terminals.

26. The telecommunication system according to claim 18, wherein said transmitter subassembly further comprises an amplifier network coupled between said plurality of first frequency translators and said multiple-beam-antenna and wherein said receiver subassembly further comprises a plurality of receiving amplifiers coupled between receiving antenna and associated ones of said second frequency translators.

27. The telecommunication system according to claim 18, wherein said transmitter subassembly and said receiver subassembly are both disposed at a first equipment location and wherein said radio transmitter assembly and said radio receiver assembly are both disposed at a second equipment location.

28. The telecommunication system according to claim 27, wherein said first equipment location is atop a base station tower and said second equipment location is a ground location, and wherein said telecommunication system further comprises a first FDM cable carrying said first FDM signal and coupling said radio transmitter assembly with said transmitter subassembly, and a second FDM cable carrying said third FDM signal and coupling said radio receiver assembly with said receiver subassembly.

29. A method of transmitting a plurality of input information-bearing signals from a base station to a corresponding plurality of wireless terminals, comprising:

forming a first frequency division multiplexed (FDM) signal from said input signals by modulating, frequency translating and then combining said input signals;

routing said first FDM signal from a first equipment location to a second equipment location;

splitting said first FDM signal, at said second equipment location, to provide a plurality of second FDM signals that are each an attenuated version of said first FDM signal;

frequency translating each of said second FDM signals to thereby place at least one of said information-bearing signals therein that resides within a predefined portion of a frequency band occupied by said first FDM signal, to within a predetermined translated frequency band; and transmitting said information-bearing signals placed within each said translated frequency band via multiple antenna beams, each pointing in a distinct direction in relation to said second equipment location.

30. The method according to claim 29, further comprising amplifying said information-bearing signals within said translated frequency band in a power sharing arrangement prior to said transmitting step.

31. The method according to claim 29, further comprising receiving, at said second equipment location, incoming information-bearing signals transmitted by wireless terminals via associated ones of said antenna beams;

frequency translating each said incoming signal received to provide translated received signals;

combining said translated received signals to form a third FDM signal;

routing said third FDM signal to a receiving equipment location;

splitting said third FDM signal at said receiving equipment location to produce a plurality of fourth FDM signals related to said third FDM signal; and extracting at least one of said incoming signals within each of said fourth FDM signals.

* * * * *